(12) United States Patent
Cui et al.

(10) Patent No.: US 9,688,018 B2
(45) Date of Patent: Jun. 27, 2017

(54) RESIN SHEETS EXHIBITING ENHANCED ADHESION TO INORGANIC SURFACES

(71) Applicant: Solutia Inc., St. Louis, MO (US)

(72) Inventors: Weihong Cui, Longmeadow, MA (US); Steven V. Haldeman, Hampden, MA (US); Francois Andre Koran, Longmeadow, MA (US); Pu Zhang, Windsor, CT (US)

(73) Assignee: SOLUTIA INC., St. Louis, MO (US)

( * ) Notice: Subject to any disclaimer, the term of this patent is extended or adjusted under 35 U.S.C. 154(b) by 0 days.

(21) Appl. No.: 14/887,907

(22) Filed: Oct. 20, 2015

(65) Prior Publication Data

US 2016/0159042 A1    Jun. 9, 2016

Related U.S. Application Data

(63) Continuation-in-part of application No. 14/562,809, filed on Dec. 8, 2014, now Pat. No. 9,382,355.

(51) Int. Cl.
*B29C 65/48* (2006.01)
*B32B 17/10* (2006.01)
*B32B 37/00* (2006.01)
*F16B 11/00* (2006.01)

(52) U.S. Cl.
CPC ........ *B29C 65/48* (2013.01); *B32B 17/10688* (2013.01); *B32B 17/10798* (2013.01); *B32B 17/10981* (2013.01); *B32B 37/0038* (2013.01); *F16B 11/006* (2013.01); *B32B 2255/10* (2013.01); *B32B 2255/24* (2013.01); *B32B 2307/542* (2013.01); *B32B 2315/08* (2013.01); *B32B 2329/00* (2013.01); *B32B 2457/12* (2013.01)

(58) Field of Classification Search
None
See application file for complete search history.

(56) References Cited

U.S. PATENT DOCUMENTS

| | | |
|---|---|---|
| 2,282,057 A | 4/1939 | Hopkins et al. |
| 2,282,026 A | 5/1942 | Bren et al. |
| 4,584,229 A | 4/1986 | Bourelier et al. |
| 6,372,352 B1 | 4/2002 | Bletsos et al. |
| 2002/0074933 A1 | 6/2002 | Lee et al. |
| 2003/0139520 A1 | 7/2003 | Toyama |
| 2008/0268214 A1* | 10/2008 | Hayes ............... B32B 17/10 428/210 |
| 2008/0280076 A1 | 11/2008 | Hayes et al. |
| 2009/0201583 A1 | 8/2009 | Kamada et al. |

(Continued)

OTHER PUBLICATIONS

Copending U.S. Appl. No. 14/562,809, filed Dec. 8, 2014, Weihong Cui.

(Continued)

*Primary Examiner* — Michael P Rodriguez
(74) *Attorney, Agent, or Firm* — Steven A. Owen

(57) ABSTRACT

Resin layers and interlayers exhibiting enhanced adhesion to inorganic surfaces, such as glass, are provided. In some cases, the layers and interlayers may comprise at least one adhesion stabilizing agent for improving adhesion to various surfaces, even in the presence of moisture. Such layers and interlayers may be useful, for example, in multiple layer panels, such as, for example, safety glass used in automotive and architectural applications.

6 Claims, 4 Drawing Sheets

(56) References Cited

U.S. PATENT DOCUMENTS

2010/0062236 A1    3/2010  Bennison et al.
2013/0022824 A1    1/2013  Meise et al.
2013/0280540 A1   10/2013  Amano et al.
2014/0210128 A1    7/2014  Lin et al.

OTHER PUBLICATIONS

Office Action dated Nov. 5, 2015 received in co-pending U.S. Appl. No. 14/562,809.
USPTO Notice of Allowance dated Sep. 9, 2015 for copending U.S. Appl. No. 14/562,809.
PCT International Search Report and Written Opinion dated Jan. 28, 2016 for International Application No. PCT/US2015/063886.
Wade, B.E., "Vinyl Acetal Polymers," in the Encyclopedia of Polymer Science & Technology, 3rd ed., vol. 8, pp. 381-399, 2003.

\* cited by examiner

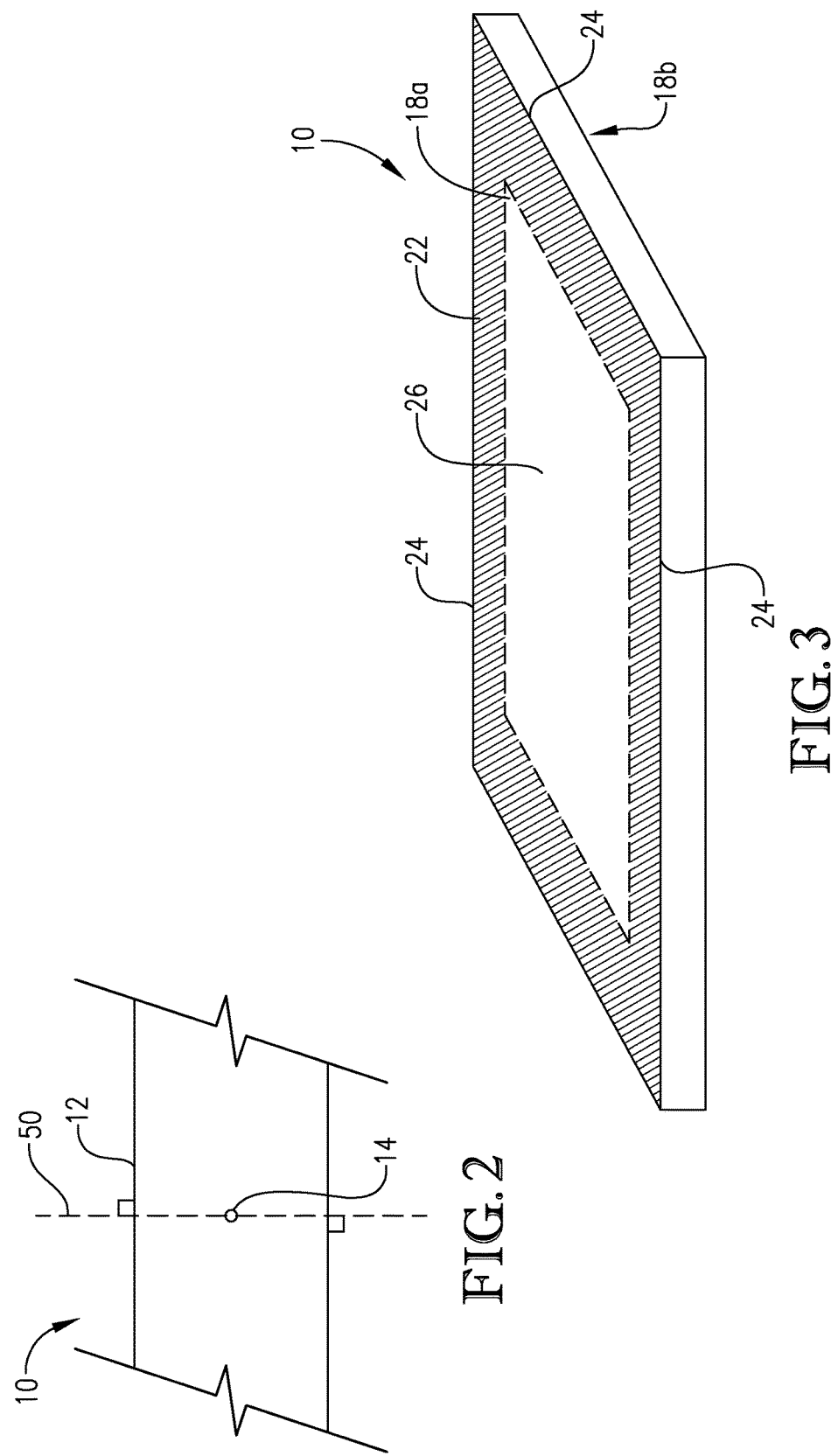

US 9,688,018 B2

RESIN SHEETS EXHIBITING ENHANCED ADHESION TO INORGANIC SURFACES

CROSS-REFERENCE TO RELATED APPLICATION(S)

This application is a continuation-in-part of U.S. application Ser. No. 14/562,809, filed Dec. 8, 2014, issued as U.S. Pat. No. 9,382,355 on Jul. 5, 2016.

BACKGROUND

1. Field of the Invention

This disclosure relates to polymer resins and, in particular, to adhesion stabilized polymer sheets suitable for use in polymer interlayers, including those utilized in multiple layer panels.

2. Description of Related Art

Polyvinyl butyral (PVB) is often used in the manufacture of polymer sheets that can be used as interlayers in multiple layer panels, including, for example, light-transmitting laminates such as safety glass. PVB is also used in photovoltaic solar panels to encapsulate the panels which are used to generate electricity for commercial and residential applications.

The term "safety glass" generally refers to a transparent laminate that includes at least one polymer sheet, or interlayer, disposed between two rigid substrates, such as, for example, two sheets of glass. Safety glass is often used as a transparent barrier in architectural and automotive applications, and one of its primary functions is to absorb energy resulting from impact and to prevent objects from passing through the laminate. Additionally, even when the applied force is sufficient to break the glass, the polymeric interlayer helps keep the glass bonded to the laminate, which prevents dispersion of sharp glass shards, thereby minimizing injury and damage to people or objects in the vicinity of the glass. Safety glass may also provide other benefits, such as a reduction in ultraviolet (UV) and/or infrared (IR) radiation, and it may also enhance the aesthetic appearance of window openings through addition of color, texture, and the like. Additionally, safety glass with desirable sound insulation properties has also been produced, which results in quieter internal spaces.

The ability of PVB to remain adhered to glass and other inorganic surfaces in a multiple layer panel depends, in part, on the environment in which the panel is utilized during service. In particular, PVB-containing multiple layer panels used in hot and humid environments are susceptible to ingress of moisture, particularly at the edges of the laminate, which may lead to edge delamination. Such delamination reduces the functionality of the panel by adversely impacting its mechanical, optical, and even acoustic performance.

Thus, a need exists for a poly(vinyl acetal) sheet that exhibits enhanced surface adhesion and that can be used in multiple layer panels utilized under a wide range of service conditions, including hot and humid environments, for extended periods of time with steady adhesion. Advantageously, such a sheet could be prepared using existing processing equipment and with minimal additional cost or process steps.

SUMMARY

One embodiment of the present invention concerns a method of making or treating an interlayer. The method comprises applying a coating material to at least a portion of at least one surface of an ionomeric resin sheet to thereby provide a surface-treated ionomeric resin sheet. The coating material comprises at least one silanol-containing adhesion stabilizing agent or precursor thereto.

Another embodiment of the present invention concerns a method of making a multiple layer panel. The method comprises applying a coating material to at least a portion of at least one surface of an ionomeric resin sheet to thereby provide a surface-treated ionomeric resin sheet comprising one or more surface-treated locations. The coating material comprises at least one silanol-containing adhesion stabilizing agent or precursor thereto. The method also comprises assembling the surface-treated ionomeric resin sheet between a pair of rigid substrates to form a construct. The surface-treated ionomeric resin is positioned between the pair of rigid substrates such that at least a portion of said surface-treated locations are in contact with one of said rigid substrates. The method also comprises laminating said construct to form said multiple layer panel.

Yet another embodiment of the present invention concerns an interlayer sheet comprising an ionomeric resin and at least one silanol-containing adhesion stabilizing agent. The sheet comprises one or more surface-treated locations exhibiting a silanol concentration gradient characterized by a surface concentration of elemental silicon that is greater than a mid-thickness concentration of elemental silicon.

DESCRIPTION OF THE DRAWINGS

Various embodiments of the present invention are described in detail below with reference to the attached drawing Figures, wherein

FIG. 2 is a schematic depiction of a cross-section of a surface-treated polymer sheet according to various embodiments of the present invention, particularly illustrating the relative positions of a surface location and a mid-thickness location;

FIG. 3 is a schematic perspective view of a surface-treated polymer sheet according to various embodiments of the present invention, particularly illustrating the perimeter and interior regions of the sheet;

DETAILED DESCRIPTION

Figure 1:
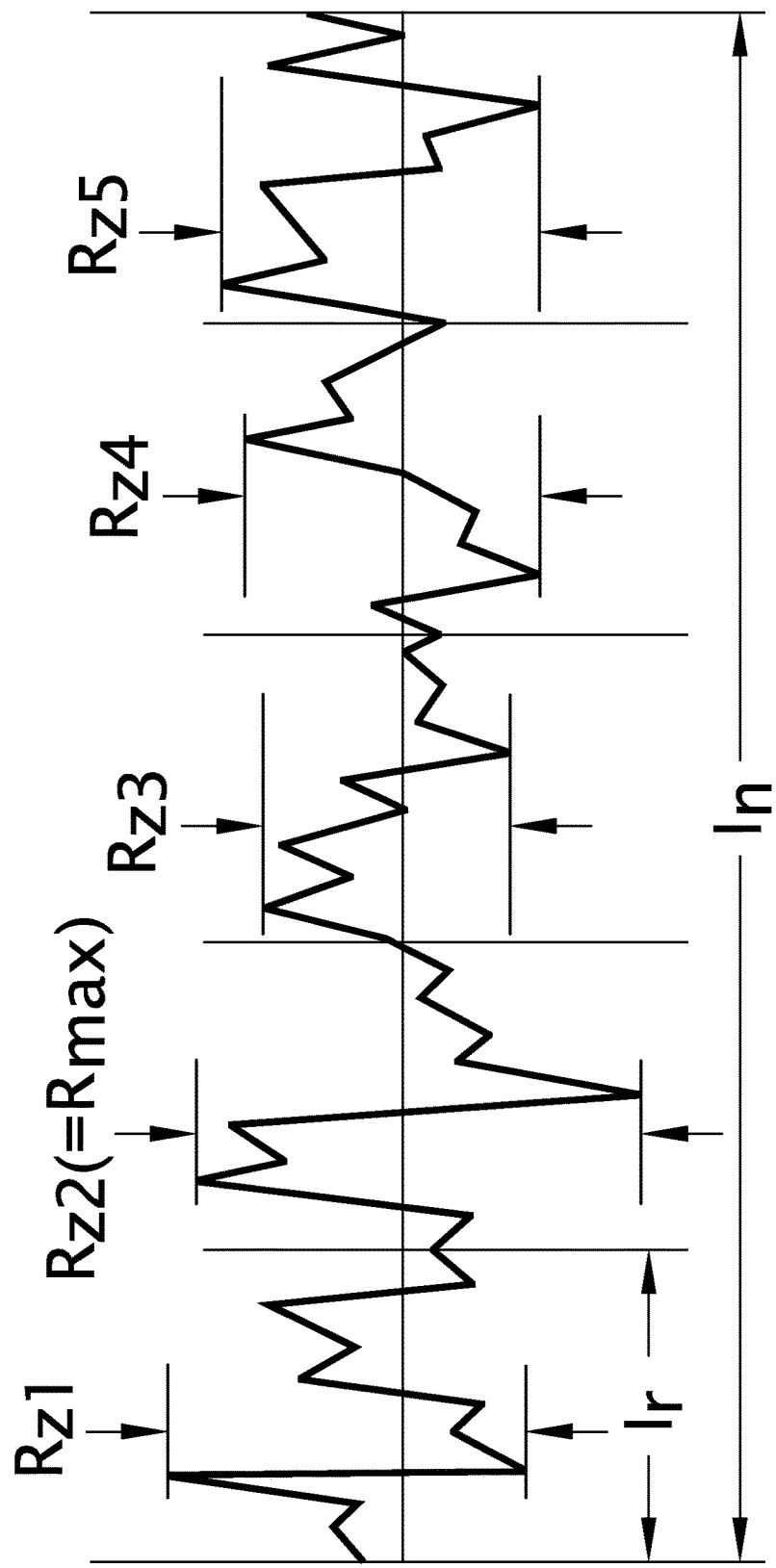
FIG. 1 is a graphical representation of how $R_z$ is measured in accordance with DIN ES ISO-4287 of the International Organization for Standardization and ASME B46.1 of the American Society of Mechanical Engineers.

The present invention relates to polymer layers and interlayers having improved adhesion to glass, metal, and other inorganic materials. In various embodiments, the layers and interlayers described herein can include a polymer sheet and at least one adhesion stabilizing agent present on at least a portion of the surface of the polymer sheet. Prior to bonding to the surface, the resin layer or interlayer may be treated with a coating composition that includes an adhesion stabilizing agent and, as a result, the treated layer may exhibit enhanced adhesion properties as compared to similar untreated sheets, particularly after prolonged exposure to hot and humid environmental conditions. Consequently, resin layers and interlayers according to embodiments of the present invention can be used in multiple layer panels that are employed in a wide variety of end uses, including automotive and architectural applications.

As used herein, the terms "polymer resin layer" and "resin layer" refer to one or more polymer resins, optionally combined with one or more plasticizers, that have been formed into a polymeric sheet. Resin layers may include one or more additional additives. As used herein, the term "interlayer" refers to a single or multiple layer polymer sheet that may be suitable for use with at least one rigid substrate to form a multiple layer panel. The terms "single-sheet" and "monolithic" interlayer refer to interlayers formed of one single sheet, while the terms "multiple layer" and "multi-layer" interlayer refer to interlayers having two or more sheets that are coextruded, laminated, or otherwise coupled to one another.

According to various embodiments of the present invention, resin layers and interlayers may include at least one polymer sheet and at least one adhesion stabilizing agent. The adhesion stabilizing agent can be any compound or material that facilitates enhanced or stabilized adhesion between the surface of the polymer sheet and another inorganic surface, such as, for example, a glass surface. In some embodiments, the inorganic surface can be part of an inorganic substrate, such as glass or metal, while, in other embodiments, the inorganic surface may be part of an organic substrate treated with an inorganic coating, such as, for example, a metal oxide coating. Rather than be incorporated into the polymer resin layer or applied to the inorganic surface itself, the adhesion stabilizing agent according to embodiments of the present invention may be present on at least a portion of the surface of the polymer sheet prior to adhering the polymer sheet to the inorganic surface.

In some embodiments, the adhesion stabilizing agent can be added to the surface of a polymer sheet by applying a coating material to at least a portion of the sheet surface. The coating material can include the adhesion stabilizing agent, or a precursor thereto, and at least one carrier liquid. When an adhesion stabilizing agent precursor is present in the coating material, at least a portion of the precursor can be converted to an adhesion stabilizing agent upon application to the sheet. Alternatively, at least a portion of the precursor may be converted to the adhesion stabilizing agent within the coating material, or the coating material may include the adhesion stabilizing agent itself.

The adhesion stabilizing agent can comprise an organic adhesion stabilizing agent, such as, for example, a silanol compound. When the adhesion stabilizing agent present on the surface of the sheet comprises a silanol, the coating material applied to the surface of the polymer sheet may include the silanol, or it may include one or more unhydrolyzed silicon-containing compounds that can be converted to silanol upon application of the coating material to the sheet. Examples of suitable silicon-containing compounds that are readily convertible into silanol containing compounds can include organic alkoxysilanes including monoalkoxysilanes, dialkoxysilanes, and trialkoxysilanes. In some embodiments, the silicon-containing compound may be a trialkoxysilane such as, for example, a trimethoxysilane or a triethoxysilane. Examples of suitable trialkoxysilanes can include, but are not limited to, γ-glycidoxypropyltrimethoxysilane, am inopropyltriethyoxysilane, aminoethylaminopropyltrimethoxysilane, and combinations thereof. When the silicon-containing compound comprises a silanol, it may comprise the hydrolyzed form of one or more of the silicon-containing compound listed above.

The coating material may further include at least one carrier liquid capable of dissolving or dispersing the adhesion stabilizing agent, or precursor thereto, and for facilitating application of the adhesion stabilizing agent or precursor to the surface of the polymer sheet. In some embodiments, the carrier liquid can comprise an aqueous carrier that can include, or be, water, while, in some embodiments, the carrier liquid can be an organic carrier that comprises one or more organic solvents, such as, for example, methanol. In some embodiments, the carrier liquid can comprise a mixture of water and one or more organic solvents, such as, for example, methanol. Depending on the type and amount of the adhesion stabilizing agent present, the coating material can have a pH of at least about 1, at least about 1.5, at least about 2, at least about 2.5, at least about 3, at least about 3.5, at least about 4, at least about 4.5 and/or not more than about 7, not more than about 6.5, not more than about 6, not more than about 5.5, or not more than about 5, or a pH in the range of from 1 to about 7, about 1.5 to about 5.5, or about 2 to about 5. In some embodiments, the coating material can have a pH of at least about 8, at least about 8.5, at least about 9, at least about 9.5 and/or not more than about 14, not more than about 13, not more than about 12, not more than about 11, or in the range of from about 8 to about 14, about 8.5 to about 13, about 9 to about 12, or about 9.5 to about 11.

The adhesion stabilizing agent, or its precursor, may be present in the coating material in any concentration and, in some embodiments, may be present in an amount of at least about 0.004, at least about 0.005, at least about 0.0075, at least about 0.010, at least about 0.025, at least about 0.050, at least about 0.10, at least about 0.25, at least about 0.75, at least about 1, at least about 1.25, at least about 1.5, at least about 2, at least about 2.5, at least about 5 and/or not more than about 25, not more than about 20, not more than about 15, not more than about 12, not more than about 10, not more than about 7.5, not more than about 5, not more than about 2.5, not more than about 2, or not more than about 1.5 weight percent, based on the total weight of the coating material, or an amount in the range of from about 0.004 to about 25, about 0.0075 to about 20, about 0.010 to about 15, or about 0.25 to about 7.5 weight percent, based on the total weight of the coating material.

The coating material can be applied to at least one surface of the polymer sheet according to any suitable method. In some embodiments, at least a portion of the sheet may be dip coated, such that all or a portion of the sheet is submerged in the coating material. In other embodiments, the coating material may be applied to at least a portion of the polymer resin surface by spray coating. Other suitable coating methods, including, for example, gravure coating or inkjet printing, may also be used. When the sheet is dip coated, the dip time can be at least about 0.5 seconds, at least about 30 seconds, at least about 1, at least about 2, at least about 5, at least about 10, at least about 30, at least about 60 minutes and/or not more than about 90, not more than about 60, not more than about 30, not more than about 15 minutes, or not more than about 10 minutes, or in the range of from about 0.5 seconds to about 90 minutes, about 30 seconds to about 30 minutes, or about 1 minute to about 10 minutes.

Once the coating material has been applied to the surface of the polymer sheet, it may be allowed to dry for a period of at least about 30 seconds, at least about 1 minute, at least about 2, at least about 3, at least about 5, at least about 10, at least about 15, at least about 30 minutes and/or not more than about 90, not more than about 60, not more than about 45, not more than about 30, not more than about 15, not more than about 10, not more than about 5 minutes, or for a period of time in the range of from 30 seconds to 90 minutes, from 1 minute to 60 minutes, or from 2 minutes to 15 minutes. Such drying can be performed under ambient conditions, in a room-temperature desiccator, or a low-temperature oven, as needed. Once dried, the surface-treated polymer sheet can be used in various applications, as described below.

In some embodiments, the polymer sheet can have a surface roughness, measured as $R_z$, of at least about 5, at least about 10, at least about, at least about 15, at least about 20, at least about 25, at least about 30, at least about 35 microns ($\mu m$) and/or not more than about 150, not more than about 100, not more than about 80, not more than about 75 $\mu m$, or it can have a surface roughness in the range of from about 5 to about 150, about 10 to about 100, or about 25 to about 75 $\mu m$. The surface roughness, or $R_z$, of the surface of the polymer sheet is measured by a 10-point average roughness in accordance with DIN ES ISO-4287 of the International Organization for Standardization and ASME B46.1 of the American Society of Mechanical Engineers. In general, under these scales, $R_z$ is calculated as the arithmetic mean value of the single roughness depths $R_{zi}$ (i.e., the vertical distance between the highest peak and the deepest valley within a sampling length) of consecutive sampling lengths:

$$R_z = \frac{1}{N} \times (R_{z1} + R_{z2} + \ldots + R_{zn})$$

A graphical depiction of the calculation of an $R_z$ value in accordance with DIN ES ISO-4287 of the International Organization for Standardization and ASME B46.1 of the American Society of Mechanical Engineers is provided in FIG. 1. In the calculation, the length of each trace ($l_R$) is 17.5 millimeters composed of seven sequential sample lengths ($l_o$) of 2.5 millimeters each. The measuring length ($l_m$) is 12.5 millimeters and is composed of five sequential sample lengths ($l_c$), obtained by eliminating the first and last sections of each trace.

In various embodiments of the present invention, at least a portion of the surface of the coated polymer sheet can comprise one or more locations that exhibit a concentration gradient of the adhesion stabilizing agent between the surface of the sheet and a mid-thickness location of the sheet. In particular, with reference to FIG. 2, the concentration gradient of the adhesion stabilizing agent may be characterized by a higher concentration of the adhesion stabilizing agent, or marker thereof, present at the surface 12 of treated sheet 10 than at a mid-thickness location 14 of sheet 10. As used herein, the term "mid-thickness location" refers to a location spaced an equal distance from the upper and lower surfaces of a sheet that lies along a line drawn through the surface-treated location 12 that is perpendicular to both the upper and lower surfaces of the sheet, as shown, for example, as dashed line 50 in FIG. 2.

In some embodiments, depending on the type and amount of adhesion stabilizing agent present on the surface of the polymer layer, the concentration gradient may be characterized by the difference in concentration of the adhesion stabilizing agent itself through the thickness of the sheet. In some embodiments, when, for example, the adhesion stabilizing agent is present on the polymer surface in relatively low amounts, the concentration gradient between the surface-treated and mid-thickness locations may be measured by detection of one or more atomic markers, such as, for example, silicon when the adhesion stabilizing agent comprises a silanol. According to various embodiments, the sheet may include one or more surface-treated locations that exhibit a silanol concentration gradient characterized by a surface concentration of elemental silicon that is greater than a mid-thickness concentration of elemental silicon.

The surface concentration of the adhesion stabilizing agent, or marker thereof, can be at least about at least about 50, at least about 100, at least about 200, at least about 400, at least about 1,000, at least about 2,000 percent higher than the mid-thickness concentration of the adhesion stabilizing agent, or marker thereof. The molar ratio of the surface concentration to the mid-thickness concentration can be at least about 10:1, at least about at least about 20:1, at least about 100:1, at least about 250:1, at least about 500:1, at least about 1000:1, at least about 5000:1, at least about 10,000:1 and/or not more than about 100,000:1, not more than about not more than about 50,000:1, not more than about 25,000:1, not more than about 15,000:1, not more than about 10,000:1, or in the range of from about 10:1 to about 100,000:1, about 500:1 to about 50,000:1, about 10,000:1 to about 50,000:1. In various embodiments, at least about 50, at least about 60, at least about 70, at least about 80, at least about 90, or at least about 95% of the total amount of the adhesion stabilizing agent can be present at or near the surface.

In some embodiments, the amount of adhesion stabilizing agent present at the surface of the polymer sheet can be characterized using X-ray photoelectron spectroscopy (XPS). The XPS method used to obtain numeric values for the amount of adhesion stabilizing agent described herein was performed using an AXIS Nova spectrometer (commercially available from Kratos Analytics Ltd, Manchester, UK) with CasaXPS software version 2.3.17. The quantification was based on a wide scan survey spectra and was reported in relative atomic mole percent. Unless otherwise specified, all survey spectra obtained during the analysis were collected with an Al $K_\alpha$ monochromatic source operating at 150 W (15 kV, 10 mA) with a pass energy of 80 eV. The acceptance angle was +/−15° in spectroscopy mode, with a take-off angle of 90° and an analysis area of 700×300 $\mu m$. The charge neutralization was on and the charge correction was C 1 s 284.8 eV. The narrow scan (high resolution) spectra were collected for elements of interest, including carbon, oxygen, and silicon, for peak fitting to elucidate oxidation states/chemical environments. These narrow spectra were collected using the same parameters described above for the wide scan with the exception of pass energy. Unless otherwise specified, the narrow scan spectra were collected using 20 eV pass energy.

According to some embodiments, the amount of silicon, or other adhesion stabilizing agent or marker thereof, present at the surface of the polymer sheet may be at least about 0.10, at least about 0.30, at least about 0.50, at least about 0.75 and/or not more than about 15, not more than about 10, not more than about 5, not more than about 3, not more than about 1.5, not more than about 1.25 atomic percent, measured by the XPS method described above. The amount of silicon, or other adhesion stabilizing agent or marker thereof, present at the surface of the polymer sheet can be in the range of from about 0.10 to about 15, about 0.3 to about 3, about 0.50 to about 1.5 atomic percent (at %), measured as described above.

The surface-treated locations of the polymer sheet can be present on substantially all, or a portion, of the surface of the polymer sheet. In some embodiments, only a portion of the surface of the sheet can be treated, such that, for example, at least about 5, at least about 10, at least about 15, at least about 20, at least about 30, or at least about 40 percent of the surface of the sheet remains untreated, while, in other embodiments, nearly all of the surface of the sheet may be treated. In some embodiments, at least about 5, at least about 10, at least about 15, at least about 20, at least about 30, at least about 40, at least about 50, at least about 60, at least about 70, at least about 80, or at least about 90 percent of the total surface area of the sheet may be treated with the adhesion stabilizing agent as described above.

Referring now to FIG. 3, a treated polymer sheet 10 can include an outer perimeter region 22, which is defined as the portion of the sheet located within 0.25 inches of the perimeter edges 24 of the sheet 10. Perimeter region 22 is shown as the shaded region of sheet 10 in FIG. 3. The surface may be treated as needed in order to obtain sufficient peel adhesion and, in some embodiments, at least about 5, at least about 10, at least about 15, at least about 20, at least about 25, at least about 30, at least about 35, at least about 40, at least about 50, at least about 60, at least about 70, at least about 80, or at least about 90 percent of the total surface area of perimeter region 22 can be made up of surface-treated locations. In other embodiments, perimeter region 22 can be less treated, or may remain untreated, such that, for example, less than about 40, not more than about 30, not more than about 20, not more than about 10, or not more than about 5 percent of the total surface area of the perimeter region 22 is made up of surface-treated locations.

As also shown in FIG. 3, the treated sheet 10 can include an interior region 26, which includes the surface area of the surface 18a of sheet outside 10 of perimeter region 22. According to some embodiments, interior region 26 may also be treated, such that at least about 40, at least about 50, at least about 60, at least about 70, at least about 80, or at least about 90 percent of the total surface area of interior region 26 can be made up of surface-treated locations. In other embodiments, interior region 26 can be less treated, or may remain untreated, such that, for example, less than about 40, not more than about 30, not more than about 20, not more than about 10, or not more than about 5 percent of the total surface area of surface region 26 is made up of surface-treated locations. In some embodiments, only one of perimeter region 22 and interior region 26 may be treated, while in other embodiments, both may be treated, such that at least about 70, at least about 80, at least about 90, or at least about 95 percent of the total surface area of sheet 10 is made up of surface-treated locations.

The layers and interlayers coated with at least one adhesion stabilizing agent according to various embodiments of the present invention may comprise one or more thermoplastic polymers. Examples of suitable thermoplastic polymers can include, but are not limited to, poly(vinyl acetal) resins, polyurethanes (PU), poly(ethylene-co-vinyl) acetates (EVA), polyvinyl chlorides (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copoloymers and ionomers thereof, derived from any of the previously-listed polymers, and combinations thereof. In some embodiments, the thermoplastic polymer can be selected from the group consisting of poly(vinyl acetal) resins, polyvinyl chloride, and polyurethanes, or the resin can comprise one or more poly(vinyl acetal) resins. Although described herein with respect to poly(vinyl acetal) resins, it should be understood that one or more of the above polymer resins could be included with, or in the place of, the poly(vinyl acetal) resins described below in accordance with various embodiments of the present invention.

Poly(vinyl acetal) resins can be formed by aqueous or solvent-based acetalization of poly(vinyl alcohol) with one or more aldehydes in the presence of an acid catalyst. The resulting resin can then be separated, stabilized, and dried according to known methods such as, for example, those described in U.S. Pat. Nos. 2,282,057 and 2,282,026, as well as "Vinyl Acetal Polymers," in the *Encyclopedia of Polymer Science & Technology*, $3^{rd}$ ed., Volume 8, pages 381-399, by B. E. Wade (2003). The total amount of residual aldehyde groups, or residues, present in the resulting poly(vinyl acetal) resin can be at least about 50, at least about 60, at least about 70, at least about 75, at least about 80, at least about 85, or at least about 90 weight percent, as measured by ASTM 1396. The total amount of aldehyde residues in a poly(vinyl acetal) resin can be collectively referred to as the acetal component, with the balance of the poly(vinyl acetal) resin comprising residual hydroxyl or acetate groups, which will be discussed in further detail below.

When the poly(vinyl acetal) resin is a poly(vinyl n-butyral) (PVB) resin, greater than 90, at least about 95, at least about 97, or at least about 99 percent, by weight, of the acetal component, or total aldehyde residues, can comprise residues of n-butyraldehyde. Additionally, a poly(vinyl n-butyral) resin may comprise less than 10, not more than about 5, not more than about 2, not more than about 1, or not more than about 0.5 weight percent of residues of an aldehyde other than n-butyraldehyde, based on the total weight of aldehyde residues of that resin. Examples of poly(vinyl n-butyral) resin include, for example, BUTVAR® PVB resin, commercially available from Solutia, Inc. (a wholly owned subsidiary of Eastman Chemical Company).

In addition to a poly(vinyl acetal) resin, the layers and interlayers may further include at least one plasticizer. The plasticizer can be present in the layer or interlayer in an amount of at least about 5, at least about 10, at least about 15, at least about 20, at least about 25, at least about 30, at least about 35, at least about 40, at least about 45, at least about 50, at least about 55, at least about 60, at least about 65, at least about 70 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr, or in the range of from about 5 to about 120, about 10 to about 110, about 20 to about 90, or about 25 to about 75 phr.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the resin composition, layer, or interlayer includes two or more resins, the weight of plasticizer is compared to the combined amount of the resins present to determine the parts per hundred resin. Further, when the plasticizer content of a layer or interlayer is provided herein, it is provided with reference to the amount of plasticizer in the mix or melt that was used to produce the layer or interlayer.

Examples of suitable plasticizers can include, but are not limited to, triethylene glycol di-(2-ethylhexanoate)

("3GEH"), triethylene glycol di-(2-ethylbutyrate), triethylene glycol diheptanoate, tetraethylene glycol diheptanoate, tetraethylene glycol di-(2-ethylhexanoate) ("4GEH"), polyethylene glycol bis(2-ethylhexanoate), dipropylene glycol dibenzoate, dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate), tetraethylene glycol di-(2-ethylhexanoate), and combinations thereof.

In some embodiments, the polymer sheet may include at least one ionomeric resin such as, for example, one or more partially neutralized acid-ethylene copolymers as mentioned above. In some embodiments, ionomeric resins can include at least about 0.1, at least about 1, at least about 5, at least about 10, at least about 15 weight percent and/or not more than about 30, not more than about 25, not more than about 20 weight percent acid functionality from, for example, one or more acrylic acids. In some embodiments, the ionomeric resin can have an acid functionality in the range of from 0.1 to 30 weight percent, from 1 to 25 weight percent, or from 5 to 20 weight percent, based on the total weight of the polymer. Examples of suitable acrylic acids can include, but are not limited to, acrylic acid, maleic acid, maleic anhydride, methacrylic acid, itaconic acid, fumaric acid, monomethyl maleic acid, and mixtures thereof. Optionally, the ethylene copolymers may include one or more additional unsaturated comonomers, including, for example, acrylates and methacrylates such as methyl acrylate, methyl methacrylate, butyl acrylate, butyl methacrylate, glycidyl methacrylate, vinyl acetate, and mixtures thereof. When present, the ethylene copolymer may include not more than about 50, not more than about 35, not more than about 25, not more than about 15, not more than about 10, not more than about 5 weight percent of one or more additional unsaturated comonomers.

To form ionomeric resins, acid-functional copolymers may be at least partially neutralized with at least one neutralization agent. In some embodiments, the ionomers may be at least about 10, at least about 15, at least about 20, at least about 25, at least about 30, at least about 40 percent and/or not more than about 90, not more than about 85, not more than about 80, not more than about 75 percent neutralized, or the percent neutralization of the ionomer can be in the range of from 10 to 90 percent, from 15 to 85 percent, or from 20 to 80 percent. Examples of suitable neutralization agents can include, but are not limited to, metallic ions such as, sodium, potassium, lithium, silver, mercury, zinc, copper, or mixtures thereof, and ammonium ions. The ions may be in monovalent, divalent, trivalent, or multivalent form. Examples of commercially available ionomeric resins can include, for example, Surlyn® resins (commercially available from DuPont). Additionally, ionomeric resin sheets are also commercially available from DuPont, under the trade name Sentryglas® Plus sheets.

Additionally, the layers and interlayers may also include various other additives to impart particular properties or features to the interlayer. Such additives can include, but are not limited to, dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers. In some embodiments, the layers and interlayers may include little or no salts, such as adhesion controlling salts (ACAs), such that the layers and interlayers comprise less than about less than about 0.02, less than about 0.01, or less than about 0.005 weight percent of one or more salts, including adhesion control salts, based on the total weight of the composition.

In certain embodiments, when the interlayer is a multiple layer interlayer, one or more of the resin layers can have similar compositions and can include similar polymer resins and/or may have similar types and/or amounts of additives. In some embodiments, two or more layers of a multiple layer interlayer can have different compositions including, for example, different types of polymer resins and/or different types and/or amounts of additives.

The thickness, or gauge, of each of the layers, or the entire interlayer, can be at least about 10, at least about 15, at least about 20 mils and/or not more than about 100, not more than about 90, not more than about 60, not more than about 50, or not more than about 35 mils, or it can be in the range of from about 10 to about 100, about 15 to about 60, or about 20 to about 35 mils. In millimeters, the thickness of the polymer layers or interlayers can be at least about 0.25, at least about 0.38, at least about 0.51 mm and/or not more than about 2.54, not more than about 2.29, not more than about 1.52, or not more than about 0.89 mm, or in the range of from about 0.25 to about 2.54 mm, about 0.38 to about 1.52 mm, or about 0.51 to about 0.89 mm.

In some embodiments, the layers or interlayers can comprise flat polymer layers having substantially the same thickness along the length, or longest dimension, and/or width, or second longest dimension, of the sheet, while, in other embodiments, one or more layers of a multilayer interlayer, for example, can be wedge-shaped or can have a wedge-shaped profile, such that the thickness of the interlayer changes along the length and/or width of the sheet, such that one edge of the layer or interlayer has a thickness greater than the other. When the interlayer is a multilayer interlayer, at least one, at least two, or at least three of the layers of the interlayer can be wedge-shaped. When the interlayer is a monolithic interlayer, the polymer sheet can be flat or wedge shaped. Wedge-shaped interlayers may be useful in, for example, heads-up-display (HUD) panels in automotive and aircraft applications.

According to various embodiments of the present invention, the surface-treated polymer sheets, including, for example, surface-treated poly(vinyl acetal) sheets, may exhibit enhanced adhesion properties as compared to, for example, similar untreated sheets. In some embodiments, the polymer layers and interlayers that include an adhesion stabilizing agent have higher peel adhesion values than conventional sheets. Additionally, the layers and interlayers according to embodiments of the present invention have lower peel adhesion loss and higher adhesion retention, even when exposed to hot and humid conditions.

In some embodiments, layers and interlayers as described herein can exhibit a 90° peel adhesion to glass of at least about 5, at least about 5.5, at least about 6, at least about 6.5, at least about 7, at least about 7.5, at least about 8, or at least about 8.5 N/cm after exposure to 95% relative humidity at 50° C. for one week.

As a result of the adhesion-stabilizing agent, the sheets and layers described herein may be capable of maintaining adhesion to a substrate despite high levels of moisture ingress, even when the laminate is exposed to conditions of elevated temperature and humidity. For example, the layers and interlayers according to embodiments of the present invention may exhibit such a peel adhesion while having an average moisture content of at least about 0.4, at least about 0.5, at least about 0.7, or at least about 1 percent, measured by Karl-Fisher Titration according to ASTM E203.

The 90° peel adhesion to glass values provided herein were determined according to the following procedure. First, a 6.75-inch by 6.75-inch glass/resin/PET laminate was prepared using a nip roll or vacuum de-airing method and the resulting laminate was autoclaved under standard laminated glass production conditions including hold conditions of 143° C. at 185 psig for 20 minutes. Prior to assembly, the glass was washed according to standard methods and the resin was conditioned to standard moisture content of 0.43 weight percent. The PET used in the laminate had a thickness of 7 mils (178 microns) and had previously been surface treated in order to provide a minimum 90° peel adhesion to glass of the PET to polyvinyl n-butyral (PVB) of 20 N/cm. Any surface treatment method can be used to treat the PET, including, for example, chemical priming, corona treatment, flame treatment, or plasma treatment, as long as the minimum peel adhesion to PVB is obtained. When assembled in the laminate, the surface-treated side of the PET was oriented toward the layer. The glass used to form the laminates was 2.3-mm thick clear float glass, and the laminate was assembled with the air-side surface of the glass oriented toward the layer.

After being autoclaved as described above, the laminates were stored at ambient conditions for at least 16 hours prior to exposure. If the laminates required conditioning prior to adhesion testing, such as, for example, exposure to high temperature and humidity as discussed in further detail below, the laminates were placed in a conditioning chamber at the desired temperature and humidity (e.g., 50° C. and 95% relative humidity) for the specified period of time (e.g., 1, 2, or 4 weeks). After the exposure period was complete, the conditioned laminates were removed from the conditioning chamber and allowed to cool to room temperature. Whether conditioned or not, samples were then prepared for the peel adhesion test by cutting each 6.75-inch by 6.75-inch glass laminate into three specimens by first cutting the laminate into three separate sections, each having dimensions of 2.25 inches by 6.75 inches, and then cutting two parallel lines with a spacing of two centimeters down the center of each specimen through the PET and PVB layers along the long side of the specimen. Both cuts extended along the entire length of each specimen. Thereafter, each specimen was turned over and the glass was scored and broken along its width at a location approximately 2.25 inches from the top. The specimen was then bent at a 90° angle along the glass score line and a utility knife was used to cut through the resin and PET layers on either side of the 2 cm test strip.

The peel adhesion of each specimen was then testing using a universal testing machine (UTM), such as those manufactured by Instron or MTS Systems, outfitted with a mounting system designed to perform a 90° peel adhesion measurement. The peel adhesion specimen was held in a sliding mounting device such that the upper 2.25-inch by 2.25-inch section was held firmly within the grips and the lower 2.25-inch by 4.5-inch section was supported, without interfering with the 2-cm test strip area, and the sample was oriented so that a 90° was maintained throughout the peel test. The specimen was then peeled at a rate of 5 inches per minute (in/min). The average peel force required over a length of 3 inches was determined (N) and normalized over the width of the test strip (2 cm) to provide the 90° peel adhesion value.

The layers and interlayers according to embodiments of the present invention also exhibit increased adhesion retention and lower loss of peel adhesion, even after exposure to hot, humid conditions. As used herein, the term "adhesion retention" refers to the amount of adhesion, measured by the 90° peel adhesion to glass test describe above, that remains after a given time and after exposure to specified conditions. Adhesion retention is calculated using formula (I), below:

$$\text{Peel Adhesion Retention} = \frac{90° \text{ Peel Adhesion}|_t}{90° \text{ Peel Adhesion}|_{t=0}} \times 100, \quad (I)$$

wherein the 90° Peel Adhesion$|_{t=0}$ is the initial 90° peel adhesion, measured prior to any conditioning, and the 90° Peel Adhesion$|_t$ is the final 90° peel adhesion, measured as described above after exposure to 95% relative humidity and a temperature of 50° C. for a time, t. In some embodiments, t can be 1 week, 2 weeks, or 4 weeks. According to various embodiments of the present invention, the layers and interlayers described herein can exhibit a peel adhesion retention, calculated according to formula (I) above, of at least about 25, at least about 30, at least about 35, at least about 40, at least about 45, at least about 50, at least about 55, at least about 60, at least about 65, or at least about 70 percent, after exposure to 95% relative humidity at 50° C. for 1 week or 2 weeks. In some embodiments, the layers and interlayers exhibit a peel adhesion retention of at least about 30, at least about 35, at least about 40, at least about 45, at least about 50, at least about 55 percent, after exposure to 95% relative humidity at 50° C. for 4 weeks.

Similarly, as used herein, the term "loss of peel adhesion" and "peel adhesion loss" refer to the reduction in adhesion, measured by the 90° peel adhesion to glass test described above, exhibited by a given layer or interlayer after a certain period of time and upon exposure to specified conditions. Loss of adhesion is calculated using formula (II), below:

$$\text{Loss of Peel Adhesion} = \frac{90° \text{ Peel Adhesion}|_{t=0} - 90° \text{ Peel Adhesion}|_t}{90° \text{ Peel Adhesion}|_{t=0}} \times 100, \quad (II)$$

wherein the 90° Peel Adhesion$|_{t=0}$ is the initial 90° peel adhesion, measured prior to any conditioning, and the 90° Peel Adhesion$|_t$ is the final 90° peel adhesion, measured as described above after exposure to 95% relative humidity and a temperature of 50° C. for a time, t. As with the peel adhesion retention, t can be 1 week, 2 weeks, or 4 weeks. The layers and interlayers according to embodiments of the present invention can exhibit a loss of peel adhesion of not more than about 60, not more than about 55, not more than about 50, not more than about 45, not more than about 40, not more than about 35, not more than about 30, not more than about 25, or not more than about 15 percent, after exposure to 95% relative humidity at 50° C. for 1 week or 2 weeks. In some embodiments, the layers and interlayers can exhibit a loss of peel adhesion of not more than about 60, not more than about 55, not more than about 50, not more than about 45, not more than about 40 percent, after exposure to 95% relative humidity at 50° C. for 4 weeks.

In some embodiments, the surface-treated polymer sheets of the present invention, including, for example, surface-treated ionomeric resin sheets as described herein, may exhibit an average compressive shear adhesion of at least about 20 MPa after exposure to 95% relative humidity at 50° C. for 3 weeks. This may be comparable to, or higher than, panels formed with untreated ionomeric resin sheets. In some embodiments, the average compressive shear adhesion of the surface-treated polymer sheets may be at least about 21, at least about 21.5, at least about 22, at least about 22.5, at least about 23, at least about 23.5, at least about 24, at least about 24.5, at least about 25, at least about 25.5 or at least about 26 MPa after exposure to 95% relative humidity at 50° C. for 3 weeks. Additionally, surface-treated polymer sheets of the present invention may have a similar average compressive shear adhesion values after exposure to 95% relative humidity at 50° C. for 1 week, as sheets that have had no exposure to conditions of high humidity and high temperature. This consistency of compressive shear adhesion performance may indicate that the surface-treated polymer sheets described herein maintain desirable adhesive properties despite prolonged exposure to high heat and humidity conditions. In some embodiments, the average compressive shear adhesion of a surface-treated polymer sheet exposed to 95% relative humidity at 50° C. for 3 weeks can be not more than about 40, not more than about 35, not more than about 30, not more than about 25, not more than about 20, not more than about 15, or not more than about 10 percent different than the average compressive shear adhesion of an identical, but untreated, resin sheet.

The average compressive shear adhesion values provided herein were determined according to the following procedure. First, two sheets of 3-mm thick float glass were washed using a standard industrial glass washing instrument, such as, for example, a Billco Type 210-40-6 industrial washer (commercially available from Billco Manufacturing of Zelienople, Pa.). In the washing instrument, the glass was conveyed through multiple zones, including a washing zone, a regular water rinse zone, a deionized water rinse zone, and a drying zone, wherein the washed glass panels are dried with air knives. The liquid used in the washing zone was prepared by mixing concentrated chlorinated powdered soap (commercially available from Salute Soap of Tirunelveli, India) with water to form a 0.03 weight percent solution. During the deionized water rinse, the temperature of the deionized water was maintained at 60.7° C.

After washing, the dried panels were assembled into a glass/polymer sheet/glass construct. The resulting construct was then de-aired using either a nip roll or a vacuum de-airing method, and the resulting laminate was autoclaved under standard laminated glass production conditions that included hold conditions of 143° C. at 185 psig for 20 minutes. After being autoclaved, the laminate was drilled to form several 3-cm diameter test specimens using a diamond core drill with a 3-cm inner diameter (commercially available from Starlight Industries) driven by a drill press rotating at a speed of 430 rpm. The individual test specimen were either tested as described below, or, optionally, exposed to a set of temperature and humidity conditions for a predetermined amount of time. Once the time period was up, the conditioned samples were tested as described below.

The compressive shear adhesion of a sample was measured by placing the sample into a sample fixture having two independent sections that are designed to grip each of the top and bottom glass lites and orient the sample at an angle of 45° to the direction of an applied force. The force is created when the two sections of the fixture are moved away from one another at a speed of 3.2 mm per minute. The applied force is measured and recorded when the sample ruptures. The compressive shear adhesion (in MPa) is calculated according to the following formula: $CSA=F/A$, wherein F is the force required to rupture the specimen (in Newtons) and A is the surface area of the sample (e.g., 707 mm$^2$ for a 3-cm diameter disc). The results of this formula where then converted to MPa by dividing by a conversion factor of 0.70686. The average compressive shear adhesion was calculated by averaging the compressive shear adhesion values for five identical samples prepared and conditioned under the same conditions.

The layers and interlayers described herein may be produced according to any suitable method. The resulting resin composition may be formed into a sheet or layer according to any suitable method including, but not limited to, solution casting, compression molding, injection molding, melt extrusion, melt blowing, and combinations thereof. When the interlayers are multilayer interlayers including two or more sheets, such multilayer interlayers can also be produced according to any suitable method, including, for example, co-extrusion, blown film, melt blowing, dip coating, solution coating, blade, paddle, air-knife, printing, powder coating, spray coating, and combinations thereof.

In various embodiments of the present invention, the layers or interlayers may be formed by extrusion or co-extrusion. In an extrusion process, one or more thermoplastic polymers, plasticizers, and, optionally, at least one additive, can be pre-mixed and fed into an extrusion device, wherein the layer or interlayer can be melted and extruded from a die to thereby provide an extruded sheet. In some embodiments, multilayer interlayers can be formed by, for example, stacking two or more resin sheets, each having a composition similar to or different than the other resin sheets, and using the stack to assemble a construct for lamination. Accordingly, in these embodiments, the lamination process may be used to create the multiple layer interlayer while simultaneously forming a multiple layer panel.

According to some embodiments of the present invention, the coating agent that includes at least one adhesion stabilizing agent, or precursor thereto, can be applied to one or more surfaces of the polymer sheet or interlayer at one or more points during its production. Or, the coating material can be applied after production, as a post-production treatment step. In some embodiments, a method for making a polymer sheet is provided in which at least a portion of the sheet can be coated on during its production. For example, after the sheet is extruded, or otherwise formed into a resin sheet according to one or more methods listed above, the coating material may be applied to at least one surface via dip coating, spray coating, gravure coating, inkjet printing, or other coating methods. In some embodiments, at least a portion of the sheet may be passed through a bath of coating material while still on the production line. Once coated, the resin can be further cooled, cut, and removed from the line.

In some embodiments, a method for treating a polymer sheet is provided that comprises applying a coating material to a pre-formed polymer sheet that has already been extruded, cooled, and optionally cut to form non-continuous polymer sheets. Such pre-formed sheets may be, in some embodiments, obtained from a third party manufacturer or another source and may be coated with at least one coating agent according to various embodiments described above. The pre-formed sheets may be coated and then stored, or may be coated and then laminated to at least one rigid substrate to form a multiple layer panel. The type and amount of the coating agent used may depend, at least in part, on the size of the sheet and its intended use.

In some embodiments, as discussed above, a coating material that includes at least one adhesion stabilizing agent may be applied to at least a portion of a surface of the resin sheet to thereby provide a surface-treated sheet. As also discussed above, the polymer sheet can include any suitable type of polymer, including a poly(vinyl acetal) resin or an ionomeric resin, and the applying may include applying at least one silanol-containing adhesion stabilizing agent, or precursor thereto, to at least a portion of the surface of the resin sheet according to any of the above-described methods. In some embodiments, none, or substantially none, of the coating material or adhesion stabilizing agent may be applied to the surface of the glass. For example, less than 10, less than 8, less than 5, less than 2, less than 1, or less than 0.5 weight percent of the total amount of adhesion stabilizing agent used in forming a multiple layer panel may be applied to the surface of one or both substrates.

Once the coating material has been applied to the surface of the polymer sheet, and, optionally, permitted to dry, the resulting surface-treated resin sheet may be assembled between a pair of rigid substrates to form a construct, which can be laminated according to a process that includes at least the following steps: (1) heating the assembly via an IR radiant or convective device for a first, short period of time; (2) passing the assembly into a pressure nip roll for the first de-airing; (3) heating the assembly for a short period of time to about 60° C. to about 120° C. to give the assembly enough temporary adhesion to seal the edge of the interlayer; (4) passing the assembly into a second pressure nip roll to further seal the edge of the interlayer and allow further handling; and (5) autoclaving the assembly at temperature between 135° C. and 150° C. and pressures between 150 psig and 200 psig for about 15 to 90 minutes. Other methods for de-airing the interlayer-glass interface, as described according to some embodiments in steps (1) through (4) above include vacuum bag and vacuum ring processes, and both may also be used to form multiple layer panels using interlayers as described herein.

According to various embodiments of the present invention, the layers and interlayers described herein may be suitable for use in various types of multiple layer panels. Such panels may include a layer or interlayer and at least one rigid substrate. Any suitable type of rigid substrate may be used, including, for example, a substrate made from glass, polycarbonate, acrylic, metal, ceramic, and combinations thereof. In some embodiments, the multilayer panels may include a pair of rigid substrates which sandwich the interlayer therebetween. The multiple layer panels can be used for a variety of end use applications, including, for example, automotive windshields and windows, aircraft windshields and windows, structural architectural panels, decorative architectural panels, photovoltaic modules, and other similar applications.

In some embodiments, one or both of the rigid substrates used to form a multiple layer panel may be float glass. Float glass is formed by floating molten glass on a bed of molten metal to form a uniformly thick, flat glass sheet that has a "tin-side" surface, which was the surface that formed in contact with the molten metal, and an "air-side" surface, which was the surface that formed away from the molten metal. In some cases, certain polymer sheets may naturally adhere more easily to the tin-side surface of a sheet of float glass and may have little or no adhesion to the air-side surface. However, in some embodiments, treating such polymer sheets with a coating material including at least one adhesion stabilizing agent, as described herein, may increase the adhesion of the surface-treated polymer sheet to the air-side surface of the glass, even when the resulting panel is subjected to high heat and humidity conditions as described above. Accordingly, in certain embodiments when at least one of the rigid substrates includes a sheet of float glass, the step of assembling the surface-treated polymer sheet between the two rigid substrates to form the construct may include positioning the surface-treated polymer such that at least a portion of the surface-treated locations on the treated surface of the resin sheet are in contact with the air-side surface of the float glass panel.

The following examples are intended to be illustrative of the present invention in order to teach one of ordinary skill in the art to make and use the invention and are not intended to limit the scope of the invention in any way.

EXAMPLES

Several poly(vinyl acetal) sheets prepared according to embodiments of the present invention are provided. More specifically, several poly(vinyl acetal) sheets treated with hydrolyzed or unhydrolyzed silane solutions were prepared and several properties of the treated samples, including 90° peel adhesion, have been determined and are compared with properties of similar, untreated samples in Examples 1-5, below. Additionally, the adhesive properties of ionomeric resin sheets, treated according to embodiments of the present invention, were also tested, and the results are provided in Example 6, below.

Example 1: 90° Peel Adhesion of PVB Samples Exposed to Hot, Humid Conditions Two sets of samples of Disclosed Sheets DS-1 and DS-2, each having a thickness of about 0.76 mm, were prepared by dip-coating PVB sheets in a hydrolyzed silane solution. The silane solution was formed by adding either γ-glycidoxy-propyltrimethxysilane, commercially available as XIAMETER® OFS 6040 from Dow Corning of Midland, Mich., or aminoethylamino-propyltrimethoxysilane, commercially available as XIAMETER® OFS 6020 from Dow Corning, to deionized water that had been acidified to a pH of 4 with glacial acetic acid. Silane was added in an amount sufficient to form a 0.4 weight percent solution and the mixture was stirred for 15 minutes until the solution became clear.

The resin samples were then submerged in the solutions of XIAMETER® OFS 6020 (DS-1) or XIAMETER® OFS 6040 (DS-2) for 2 minutes. After submersion, the samples were air dried and then conditioned at a temperature of 32.7° C. and 24% relative humidity until the moisture content of the samples were 0.43 percent. The conditioned samples were then laminated between a plate of clean soda-lime glass and a 7-mil thick, plasma-treated PET film using a nip roll/autoclave technique as described previously. Samples of an untreated Comparative Sheet CS-1, which had not been dipped in a coating solution, were also conditioned and laminated as described above.

An initial value for the 90° peel adhesion to glass of each sample was determined using one sample from each set, and the remaining samples were exposed to conditions of 50° C. and 95% relative humidity for a period of 2 or 4 weeks. After each conditioning period, one sample from each set was removed and the 90° peel adhesion was measured. The results of the initial, 2-week, and 4-week 90° peel adhesion tests for each of the Comparative and Disclosed Sheets are summarized in Table 1, below. In addition, Table 1 provides the peel adhesion retention and loss of peel adhesion for each of the 2-week and 4-week samples, as compared to the initial 90° peel adhesion values.

TABLE 1

Peel Adhesion of PVB Samples Exposed to Hot, Humid Conditions

| PVB Sample | Solution | | Peel Adhesion (N/cm) | | | Peel Adhesion Retention (%) | | Loss of Peel Adhesion (%) | |
|---|---|---|---|---|---|---|---|---|---|
| | Silane | Concentration (wt %) | Initial | 2 weeks | 4 weeks | 2 weeks | 4 weeks | 2 weeks | 4 weeks |
| CS-1 | — | — | 23.77 | 5.89 | 6.79 | 24.8% | 28.6% | 75.2% | 71.4% |
| DS-1 | XIAMETER ® OFS 6020 | 0.4 | 27.70 | 11.57 | 13.40 | 41.8% | 48.4% | 58.2% | 51.6% |
| DS-2 | XIAMETER ® OFS 6040 | 0.4 | 27.96 | 14.79 | 12.96 | 52.9% | 46.4% | 47.1% | 53.6% |

As shown in Table 1, above, PVB samples treated with hydrolyzed silane exhibited higher 90° peel adhesion to glass than untreated PVB, both initially and after exposure to hot and humid conditions. Additionally, the Disclosed Sheets DS-1 and DS-2 exhibited higher peel adhesion retention, and a correspondingly lower loss of peel adhesion, than Comparative Sheet CS-1, as shown above.

Example 2: Peel Adhesion of Silane-Treated PVB Samples Treated at Various Dip Times Disclosed Sheets DS-3 through DS-5 were prepared by submerging several sets of PVB sample sheets into an aqueous solution of 0.4 weight percent of XIAMETER® OFS 6040, prepared as described above in Example 1. Each set of resin samples was submerged and the samples were removed after dip times of 30 seconds (DS-3), 1 minute (DS-4), and 2 minutes (DS-5). The samples were then air dried, conditioned, and laminated as described above. A set of samples of a Comparative Sheet CS-2 was also prepared by conditioning and laminating untreated PVB sheet samples as described previously.

An initial value for the 90° peel adhesion of each sample was determined using one sample from each set, and the remaining samples were exposed to conditions of 50° C. and 95% relative humidity for a period of 2 weeks. After the conditioning period, the samples were removed and the 90° peel adhesion was tested. The results of the initial and 2-week 90° peel adhesion tests for each of the Comparative and Disclosed Sheets are summarized in Table 2, below. In addition, Table 2 provides the peel adhesion retention and loss of peel adhesion for the samples after 2 weeks, as compared to the initial peel adhesion values.

TABLE 2

Peel Adhesion for PVB Samples Treated with Silane at Various Dip Times

| PVB Sample | Solution | | Peel Adhesion (N/cm) | | Peel Adhesion Retention (%) | Loss of Peel Adhesion (%) |
|---|---|---|---|---|---|---|
| | Silane | Dip Time (min) | Initial | 2 weeks | 2 weeks | 2 weeks |
| CS-2 | — | — | 17.70 | 4.40 | 24.9% | 75.1% |
| DS-3 | XIAMETER ® OFS 6040 | 0.5 | 22.80 | 13.00 | 57.0% | 43.0% |
| DS-4 | XIAMETER ® OFS 6040 | 1 | 24.50 | 13.30 | 54.3% | 45.7% |
| DS-5 | XIAMETER ® OFS 6040 | 2 | 26.20 | 15.60 | 59.5% | 40.5% |

As shown in Table 2, above, the Disclosed Sheet DS-5, which was treated with a longer dip time than Disclosed Sheets DS-2 and DS-3, exhibited a higher initial 90° peel adhesion, as well as a higher 90° peel adhesion after conditioning in a hot, humid environment. Additionally, each of the Disclosed Sheets DS-3 through DS-5 exhibited higher 90° peel adhesion, as well as higher peel adhesion retention (and correspondingly lower loss of 90° peel adhesion) than the untreated sample.

Example 3: Peel Adhesion of PVB Samples Treated with Silane Solutions of Varying Concentration Disclosed Sheets DS-6 through DS-9 were prepared by submerging several sets of PVB sheets into several hydrolyzed silane solutions having varying concentrations, including 0.2 weight percent (DS-6), 0.4 weight percent (DS-7), 0.7 weight percent (DS-8), or 1 weight percent (DS-9) of XIAMETER® OFS 6040 for a dip time of 2 minutes. After 2 minutes, the samples were air dried, conditioned, and laminated as described in the above Examples. Comparative Sheet CS-3 samples were also prepared by conditioning and laminating untreated PVB resin as described previously.

An initial value for the 90° peel adhesion of each sample was determined using one sample from each set, and the remaining samples were exposed to conditions of 50° C. and 95% relative humidity for a period of 2 weeks. After the conditioning period, the samples were removed and the 90° peel adhesion was tested. The results of the initial and 2-week 90° peel adhesion tests for each of the Comparative and Disclosed Sheets are summarized in Table 3, below. In addition, Table 3 provides the peel adhesion retention and loss of peel adhesion for the samples after 2 weeks, as compared to the initial peel adhesion values.

TABLE 3

Peel Adhesion for PVB Samples Treated with Silane of Varying Concentration

| PVB Sample | Solution Silane | Concentration (wt %) | Peel Adhesion (N/cm) Initial | Peel Adhesion (N/cm) 2 weeks | Peel Adhesion Retention (%) 2 weeks | Loss of Peel Adhesion (%) 2 weeks |
|---|---|---|---|---|---|---|
| CS-3 | — | — | 23.10 | 5.20 | 22.5% | 77.5% |
| DS-6 | XIAMETER® OFS 6040 | 0.2 | 22.80 | 10.20 | 44.7% | 55.3% |
| DS-7 | XIAMETER® OFS 6040 | 0.4 | 26.20 | 15.60 | 59.5% | 40.5% |
| DS-8 | XIAMETER® OFS 6040 | 0.7 | 26.50 | 15.70 | 59.2% | 40.8% |
| DS-9 | XIAMETER® OFS 6040 | 1.0 | 28.10 | 17.00 | 60.5% | 39.5% |

As shown in Table 3, above, Disclosed Sheet DS-9, which was treated with a higher-concentration hydrolyzed silane solution exhibited higher 90° peel adhesion values, both initially and after a 2-week conditioning period at high temperature and humidity. Consequently, the peel adhesion retention of DS-9 was higher (and its peel adhesion loss correspondingly lower) than the values for the other sheets. Additionally, as shown in Table 3, each of the Disclosed Sheets DS-6 through DS-9 exhibited higher 90° peel adhesion and higher peel adhesion retention than the untreated Comparative Sheet CS-3.

Example 4: Peel Adhesion of Spray-Coated PVB Samples Using Hydrolyzed and Unhydrolyzed Silane Solutions A hydrolyzed silane solution was formed by adding XIAMETER® OFS 6040 to deionized water that had been acidified to a pH of 4 with glacial acetic acid. The silane was added in an amount sufficient to form a 0.3 weight percent solution. The surface of several samples of PVB resin were then evenly spray coated with the hydrolyzed solution. The amount of solution spray coated onto the surface was dependent on the weight of the sample and the spray was applied to achieve a target silicon concentration, as summarized in Table 4a, below. Each of the treated Disclosed Resin Sheets DS-10 through DS-12 were air dried and laminated as described previously. A set of untreated Comparative Sheet CS-4 samples were also prepared by conditioning and laminating untreated PVB resin as described previously.

Figure 4:
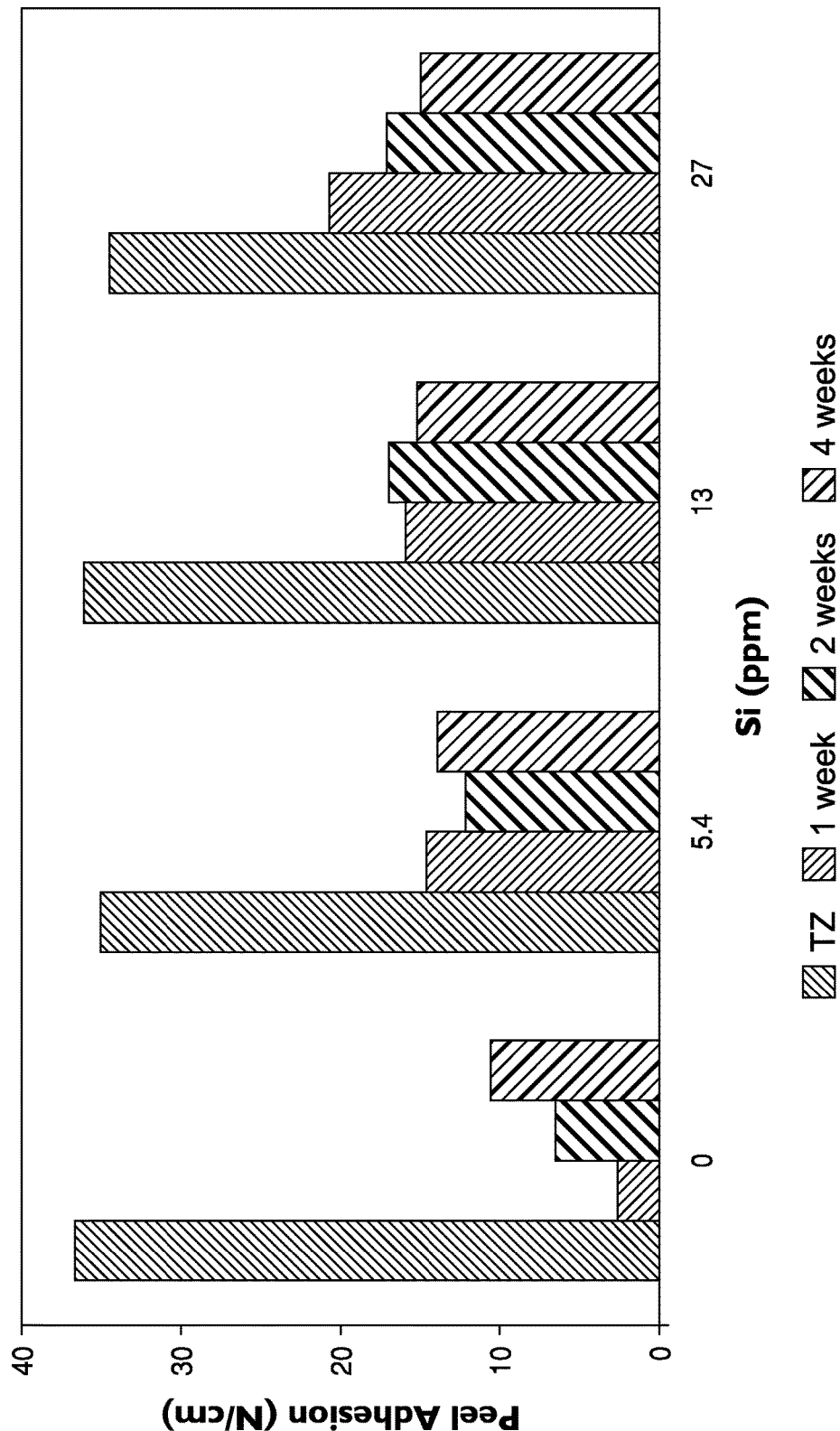
FIG. 4 is a graphical depiction of the peel adhesion values for several poly(vinyl n-butyral) resin samples treated with hydrolyzed silane spray as described in Example 4.

An initial value for the 90° peel adhesion of each sample was determined using one sample from each set, and the remaining sample sets were exposed to conditions of 50° C. and 95% relative humidity for a period of 1, 2, and 4 weeks. After a conditioning period, the samples were removed and the 90° peel adhesion was tested according to the procedure described previously. The results of the initial, 1-week, 2-week, and 4-week 90° peel adhesion tests for each of the Comparative and Disclosed Sheets are summarized in Table 4a, below. In addition, Table 4b provides the peel adhesion retention and loss of peel adhesion for the samples after 1, 2, and 4 weeks, as compared to the initial peel adhesion values. These values are summarized graphically in FIG. 4.

TABLE 4a

Peel Adhesion for PVB Samples Treated with Hydrolyzed Silane Spray

| PVB Sample | Target Si Concentration | Peel Adhesion (N/cm) Initial | 1 week | 2 weeks | 4 weeks |
|---|---|---|---|---|---|
| CS-4 | 0 | 36.7 | 2.6 | 6.5 | 10.6 |
| DS-10 | 5.4 | 35.1 | 14.6 | 12.2 | 13.9 |
| DS-11 | 13 | 36.1 | 16.0 | 17.0 | 15.2 |
| DS-12 | 27 | 34.5 | 20.7 | 17.11 | 15.0 |

TABLE 4b

Peel Adhesion Retention & Loss of Peel Adhesion for PVB Samples Treated with Hydrolyzed Silane Spray

| PVB Sheet | Peel Adhesion Retention (%) 1 week | 2 weeks | 4 weeks | Loss of Peel Adhesion (%) 1 week | 2 weeks | 4 weeks |
|---|---|---|---|---|---|---|
| CS-4 | 7.1% | 17.7% | 28.9% | 92.9% | 82.3% | 71.1% |
| DS-10 | 41.7% | 34.8% | 39.6% | 58.3% | 65.2% | 60.4% |
| DS-11 | 44.2% | 47.1% | 42.1% | 55.8% | 52.9% | 57.9% |
| DS-12 | 60.0% | 49.6% | 43.5% | 40.0% | 50.4% | 56.5% |

An unhyrdoylzed silane solution was formed by adding XIAMETER® OFS 6040 to methanol to form a 0.3 weight percent solution of silane. The surface of several samples of PVB resin were then evenly spray coated with the unhydrolyzed solution. The amount of solution spray coated onto the surface was dependent on the weight of the sample and the spray was applied to achieve a target silicon concentration, as summarized in Table 5a, below. Each of the treated Disclosed Resin Sheets DS-13 through DS-15 were then air dried and laminated as described previously.

Figure 5:
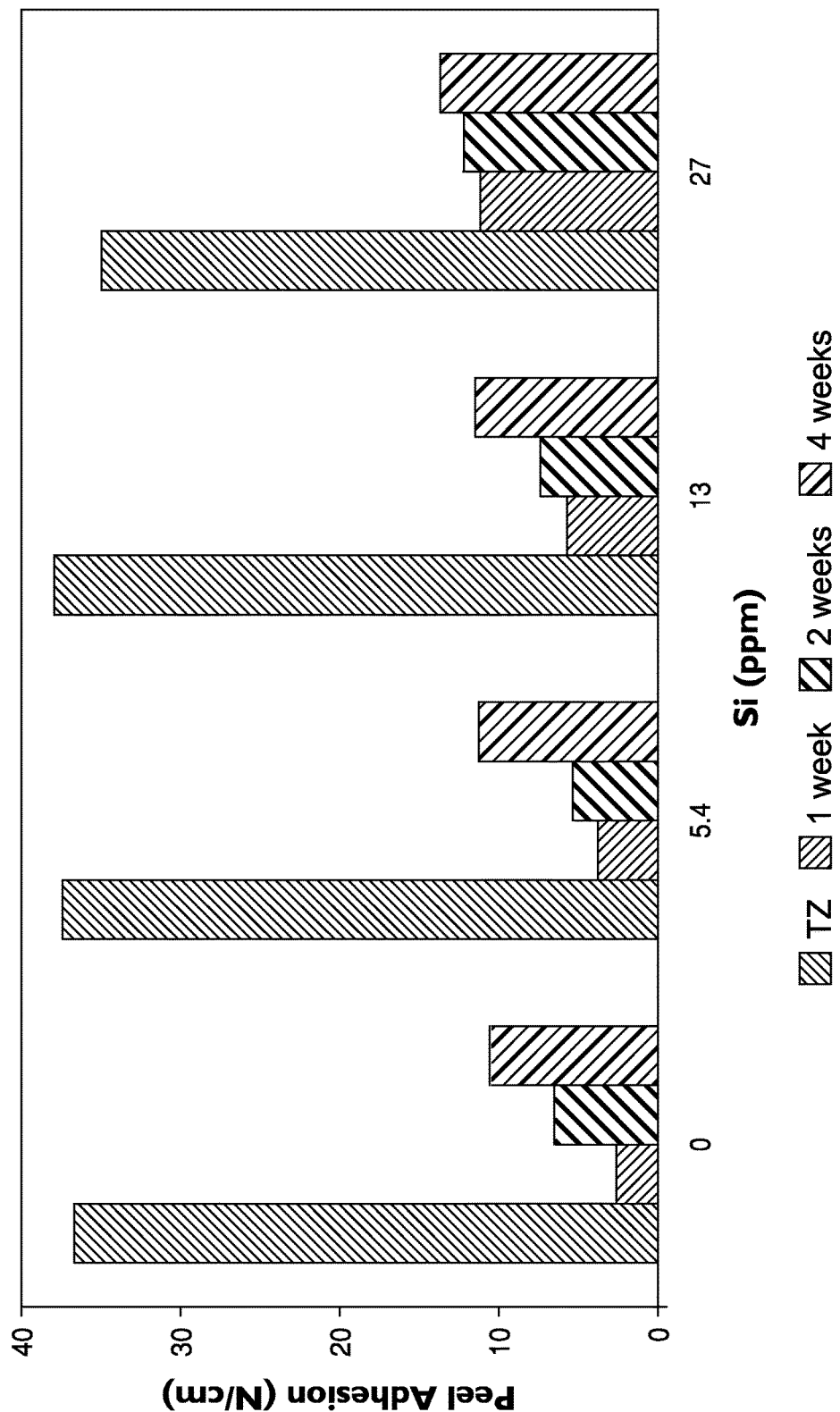
FIG. 5 is a graphical depiction of the peel adhesion values for several poly(vinyl n-butyral) resin samples treated with an unhydrolyzed silane spray as described in Example 4.

An initial value for the 90° peel adhesion of each sample was determined using one sample from each set, and the remaining sample sets were exposed to conditions of 50° C. and 95% relative humidity for a period of 1, 2, and 4 weeks. After a conditioning period, the samples were removed and the 90° peel adhesion was tested according to the procedure described previously. The results of the initial, 1-week, 2-week, and 4-week 90° peel adhesion tests for each of the Comparative and Disclosed Sheets are summarized in Table 5a, below. In addition, Table 5b provides the peel adhesion retention and loss of peel adhesion for the samples after 1, 2, and 4 weeks, as compared to the initial peel adhesion values. These values are summarized graphically in FIG. 5.

TABLE 5a

Peel Adhesion for PVB Samples Treated with Unhydrolyzed Silane Spray

| PVB Sample | Target Si Concentration | Peel Adhesion (N/cm) | | | |
|---|---|---|---|---|---|
| | | Initial | 1 week | 2 weeks | 4 weeks |
| CS-4 | 0 | 36.7 | 2.6 | 6.5 | 10.6 |
| DS-13 | 5.4 | 37.5 | 3.8 | 5.3 | 11.2 |
| DS-14 | 13 | 37.9 | 5.7 | 7.4 | 11.5 |
| DS-15 | 27 | 35.0 | 11.1 | 12.2 | 13.7 |

TABLE 5b

Peel Adhesion Retention & Loss of Peel Adhesion for PVB Samples Treated with Unhydrolyzed Silane Spray

| PVB Sheet | Peel Adhesion Retention (%) | | | Loss of Peel Adhesion (%) | | |
|---|---|---|---|---|---|---|
| | 1 week | 2 weeks | 4 weeks | 1 week | 2 weeks | 4 weeks |
| CS-4 | 7.1% | 17.7% | 28.9% | 92.9% | 82.3% | 71.1% |
| DS-13 | 10.1% | 14.1% | 29.9% | 89.9% | 85.9% | 70.1% |
| DS-14 | 15.1% | 19.5% | 30.3% | 84.9% | 80.5% | 69.7% |
| DS-15 | 31.8% | 34.9% | 39.1% | 68.2% | 65.1% | 60.9% |

Example 5: Peel Adhesion of PVB Sheets with Varying Surface Roughness

Disclosed Sheet DS-16 was prepared by submerging several sets of PVB sheets having a surface roughness, measured by $R_z$, of 30 μm into a 0.4 weight percent solution of XIAMETER® OFS 6040. After submersion, the samples were air dried, conditioned, and laminated as described in the above Examples. Comparative Sheets CS-7 was prepared in a similar manner, but had an initial surface roughness of less than 4 μm. $R_z$ was measured as described previously. Additionally, Comparative Sheets CS-5 and CS-6 were also prepared by conditioning and laminating untreated PVB resin as described previously.

An initial value for the 90° peel adhesion of each sample was determined using one sample from each set, and the remaining samples were exposed to conditions of 50° C. and 95% relative humidity for a period of 2 weeks. After the conditioning period, the samples were removed and the 90° peel adhesion was tested. The results of the initial and 2-week 90° peel adhesion tests for each of the Comparative and Disclosed Sheets are summarized in Table 6, below. In addition, Table 6 provides the peel adhesion retention and loss of peel adhesion for the samples after 2 weeks, as compared to the initial peel adhesion values.

TABLE 6

Peel Adhesion Retention & Loss of Peel Adhesion for PVB Samples with Varying Surface Roughness

| PVB Sample | $R_z$ (μm) | Silane Concentration (wt %) | Peel Adhesion (N/cm) | | Peel Adhesion Retention (%) | Loss of Peel Adhesion (%) |
|---|---|---|---|---|---|---|
| | | | Initial | 2 weeks | 2 weeks | 2 weeks |
| CS-5 | 30 | — | 23.1 | 5.2 | 22.5% | 77.5% |
| CS-6 | <4 | — | 24.6 | 4.4 | 18.0% | 82.0% |
| CS-7 | <4 | 0.4 | 30.0 | 4.0 | 13.0% | 87.0% |
| DS-16 | 30 | 0.4 | 26.2 | 15.6 | 59.5% | 40.5% |

As shown in Table 6, above, when a PVB sheet with a surface roughness less than 4 μm is treated with hydrolyzed silane solution, a reduction in peel adhesion retention and increased peel adhesion loss is observed, as compared to a PVB sheet having a higher surface roughness treated under similar conditions.

Example 6: Average Compressive Shear Adhesion for Ionomeric Resin Interlayers Sheets of ethylene-carboxylic acid ionomer (commercially available from Du Pont as Sentryglas® Plus) were used to form several glass/ionomer/glass constructs using pairs of 3-mm thick sheets of clear float glass. Prior to assembling the constructs, each side of one of the ionomeric sheets, which measured 6 inches by 6 inches, was spray coated with 0.25 mL of a 0.4-weight percent solution formed by adding aminoethylaminopropyltrimethoxysilane, commercially available as XIAMETER® OFS 6020 from Dow Corning, to deionized water that had been acidified to a pH of 4 with glacial acetic acid (Solution A). Another of the ionomeric sheets was spray coated on both sides with a similar 0.4-weight percent solution formed by adding γ-glycidoxypropyltrimethoxysilane, commercially available as XIAMETER® OFS 6040 from Dow Corning, to deionized water that had been acidified to a pH of 4 with glacial acetic acid (Solution B). Both sheets were allowed to dry before being assembled into a glass/ionomer/glass construct with the treated-surfaces of the ionomer resin sheets in contact with the air-side surfaces of each of the glass sheets. The resulting constructs were de-aired and laminated as described above to form Disclosed Panels DP-1 and DP-2.

Several Comparative Panels were also formed using ionomer resin sheets. Two comparative panels, CP-1 and CP-2, were formed in a similar manner as DP-1 and DP-2, but the air-side surfaces of each glass panel, rather than the ionomer, were spray coated with Solution A (Comparative Panel CP-1) or Solution B (Comparative Panel CP-2) and permitted to dry. The resulting treated glass panels were assembled with the coated surface of the glass in contact with the untreated ionomer layers, and the resulting constructs were de-aired and laminated as described above. Similarly, two Control Panels (CoP-1 and CoP-2) were also formed by laminating an untreated ionomer sheet between untreated float glass panels, with the float glass oriented with the ionomer in contact with the air-side (CoP-1) or tin-side (CoP-2) surfaces of the glass panels. Each of Control Panels CoP-1 and CoP-2 were also de-aired and laminated as described above.

Three sets of 3-cm diameter test specimen were then drilled from each of Disclosed Panels DP-1 and DP-2, Comparative Panels CP-1 and CP-2, and Control Panels CoP-1 and CoP-2 and the average compressive shear adhesion for each panel was tested for each set of samples as described above. An initial average compressive shear adhesion value was determined for one set of samples of each panel, and the remaining specimen were exposed to conditions of 95% relative humidity and a temperature of 50° C. for 1 or 3 weeks. After the conditioning period for each set of samples passed, the specimen were removed and the average compressive shear adhesion values of the conditioned specimen were determined as described above. The results of the initial, 1-week, and 3-week average compressive shear adhesion for each of Disclosed Panels DP-1 and DP2, Comparative Panels CP-1 and CP-2, and Control Panels CoP-1 and CoP-2 are summarized in Table 7, below.

TABLE 7

Average Compressive Shear Adhesion for Panels formed with Ionomeric Resin Interlayers

| Panel | Solution Applied to | Ionomer Contact | Compressive Shear Adhesion (MPa) Initial[1] | | | | | | Compressive Shear Adhesion (MPa) 1 week at 95% RH/50° C. | |
|---|---|---|---|---|---|---|---|---|---|---|
| | | | 1 | 2 | 3 | 4 | 5 | Avg | 1 | 2 |
| DP-1 | A | Resin | Air-side | 24.3 | >28.3 | 16.4 | >28.3 | 19.5 | — | >28.3 | >28.3 |
| DP-2 | B | Resin | Air-side | >28.3 | >28.3 | >28.3 | 23.4 | 27.4 | — | 16.0 | 19.2 |
| CP-1 | A | Glass (Air-side) | Air-side | >28.3 | 20.7 | 15.7 | >28.3 | 21.3 | — | 24.3 | >28.3 |
| CP-2 | B | Glass (Air-side) | Air-side | 26.9 | >28.3 | >28.3 | 25.2 | >28.3 | — | >28.3 | 22.1 |
| CoP-1[2] | n/a | n/a | Air-side | n/a | n/a | n/a | n/a | n/a | n/a | n/a | n/a |
| Co2P-2 | n/a | n/a | Tin-side | 27.6 | >28.3 | 20.2 | 19.7 | 26.9 | — | >28.3 | 26.5 |

| Panel | Compressive Shear Adhesion (MPa) 1 week at 95% RH/50° C. | | | | Compressive Shear Adhesion (MPa) 3 weeks at 95% RH/50° C. | | | | | |
|---|---|---|---|---|---|---|---|---|---|---|
| | 3 | 4 | 5 | Avg | 1 | 2 | 3 | 4 | 5 | Avg |
| DP-1 | >28.3 | >28.3 | >28.3 | — | >28.3 | >28.3 | >28.3 | 26 | 22 | — |
| DP-2 | 25.2 | 21.0 | >28.3 | — | 26 | 26 | 23 | 26 | 13 | 23 |
| CP-1 | >28.3 | >28.3 | >28.3 | — | 26 | >28.3 | >28.3 | >28.3 | 18 | — |
| CP-2 | >28.3 | >28.3 | >28.3 | — | >28.3 | >28.3 | >28.3 | >28.3 | >28.3 | — |
| CoP-1[2] | n/a | n/a | n/a | n/a | n/a | n/a | n/a | n/a | n/a | n/a |
| Co2P-2 | 26.3 | 18.9 | 23.4 | — | 23 | 24 | 24 | 25 | 23 | 24 |

Notes
[1]Equipment had load cell maximum of 28.3 MPa. Samples that had not ruptured at maximum force were removed and reported as having a compressive shear adhesion of >28.3 MPa.
[2]Untreated air-side samples (CoP-1) fell apart during drilling and could not be tested.

As shown in Table 7, above, Disclosed Panels DP-1 and DP-2, which were formed with ionomeric resin layers coated with solutions of silane-containing adhesion stabilizing agents, exhibited similar compressive shear adhesion values as Comparative Panels CP-1 and CP2, which were formed by coating the glass surface. This similarity in adhesion was observed both initially, after no sample conditioning, and after the samples were exposed to 95% relative humidity at 50° C. for 1 and 3 weeks.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. A method of making or treating an interlayer, said method comprising: applying a coating material to at least a portion of at least one surface of an ionomeric resin sheet to thereby provide a surface-treated ionomeric resin sheet, wherein said coating material comprises at least one silanol-containing adhesion stabilizing agent or precursor thereto; wherein said surface-treated ionomeric resin sheet comprises one or more surface-treated locations that exhibit a silanol concentration gradient characterized by a surface concentration of elemental silicon that is greater than a mid-thickness concentration of elemental silicon, wherein said ionomeric resin sheet comprises a perimeter region defined as the portion of said ionomeric resin sheet located within 0.25 inches of the perimeter edges of said ionomeric resin sheet, wherein at least a portion of said surface-treated locations are located within said perimeter region and wherein at least 10 percent of the total surface area of said perimeter region is made up of at least a portion of said surface-treated locations.

2. The method of claim 1, wherein said silanol-containing adhesion stabilizing agent or precursor thereto is present in said coating material in an amount of at least 0.25 weight percent, based on the total weight of said coating material.

3. The method of claim 1, wherein said silanol-containing adhesion stabilizing agent or precursor thereto comprises at least one alkoxysilane selected from the group consisting of γ-glycidoxypropyltrimethoxysilane, aminoethylaminopropyltrimethoxysilane, and combinations thereof.

4. The method of claim 1, wherein said applying includes spray coating at least a portion of said coating material onto at least a portion of said surface.

5. The method of claim 1, wherein said method is a method of treating an interlayer; further comprising, prior to said applying, obtaining a pre-formed ionomeric resin sheet, wherein said applying includes applying said coating material to at least a portion of said pre-formed resin sheet to provide said surface-treated ionomeric resin sheet.

6. The method of claim 1, wherein said method is a method of making an interlayer; further comprising, prior to said applying, forming said ionomeric resin sheet, wherein said applying includes applying said coating material to at least a portion of said ionomeric resin sheet after said forming.

\* \* \* \* \*